July 4, 1939.    R. B. LEWIS    2,164,993
RATE OF STRAIN INDICATOR
Filed Sept. 17, 1934    2 Sheets-Sheet 1

INVENTOR
Robert B. Lewis
BY
Herbert S. Fairbanks
ATTORNEY

July 4, 1939.                R. B. LEWIS                2,164,993
                      RATE OF STRAIN INDICATOR
              Filed Sept. 17, 1934         2 Sheets-Sheet 2
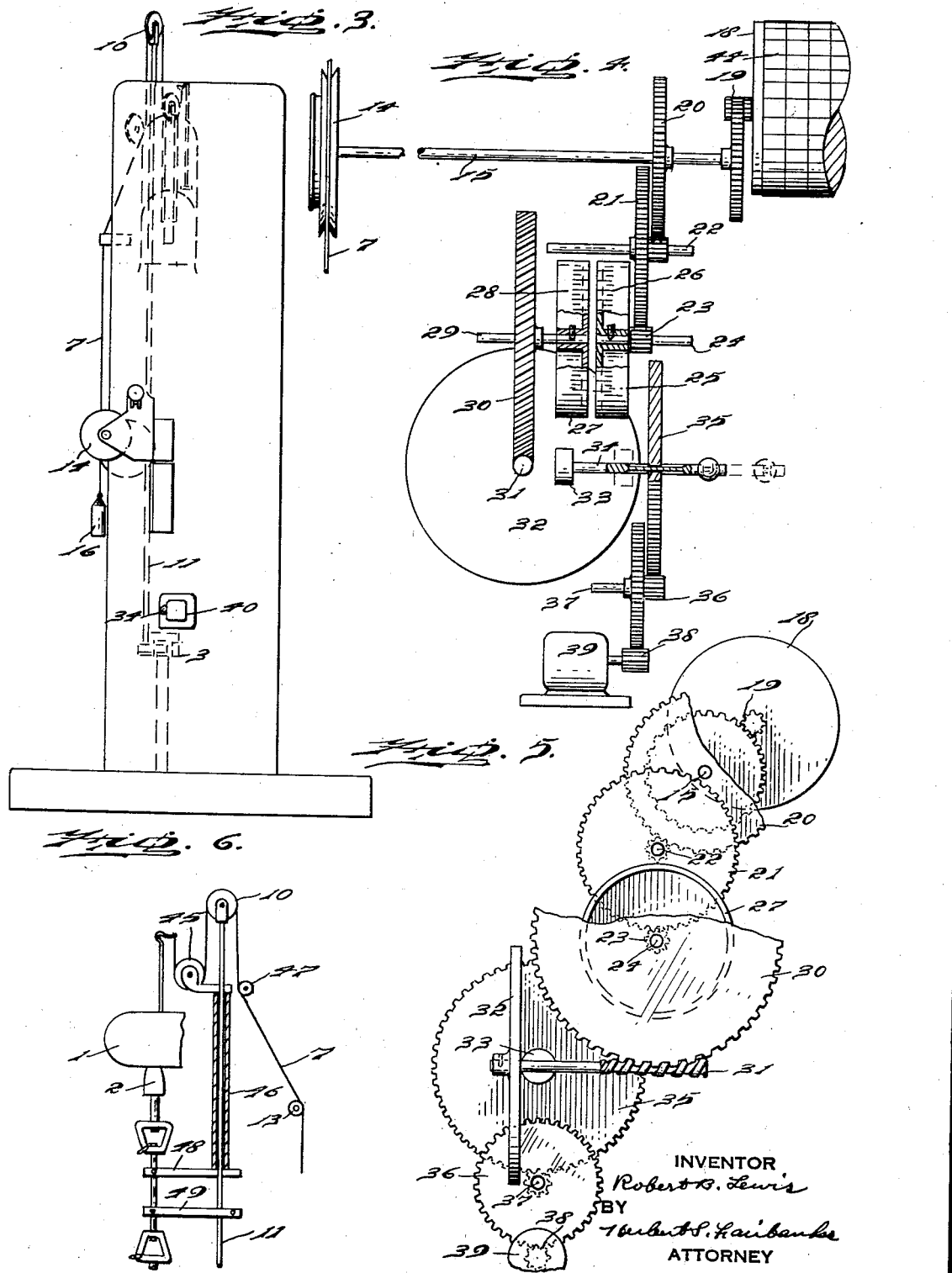
INVENTOR
Robert B. Lewis
BY
Herbert P. Fairbanks
ATTORNEY Patented July 4, 1939

2,164,993

UNITED STATES PATENT OFFICE 2,164,993

RATE OF STRAIN INDICATOR

Robert B. Lewis, Philadelphia, Pa., assignor to Tinius Olsen Testing Machine Company, Philadelphia, Pa., a corporation of Pennsylvania Application September 17, 1934, Serial No. 744,305

8 Claims. (Cl. 265—2)

The object of my invention is to time the rate of change of the length of a specimen under test, and to indicate the test load in pounds.

A pendulum dial load indicator with an autographic apparatus has been set forth in my copending applications Serial No. 637,394 for Universal testing machine, Serial No. 690,993 for Fluid regulator and Serial No. 690,994 for Speed comparing device, and my present invention is adapted to be employed in a testing machine of the general type set forth in my applications aforesaid.

With the above and other objects in view, as will hereinafter clearly appear, my invention comprehends novel mechanism for indicating the change in length of the specimen under test.

Other novel features of construction and advantage will hereinafter clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 3 is an end elevation.

Figure 4 is a front elevation on an enlarged scale of certain details of the machine.

Figure 5 is an end elevation of the construction seen in Figure 4.

Figure 6 is a detail of another embodiment of my invention.

Similar numerals indicate corresponding parts.

Figure 1:
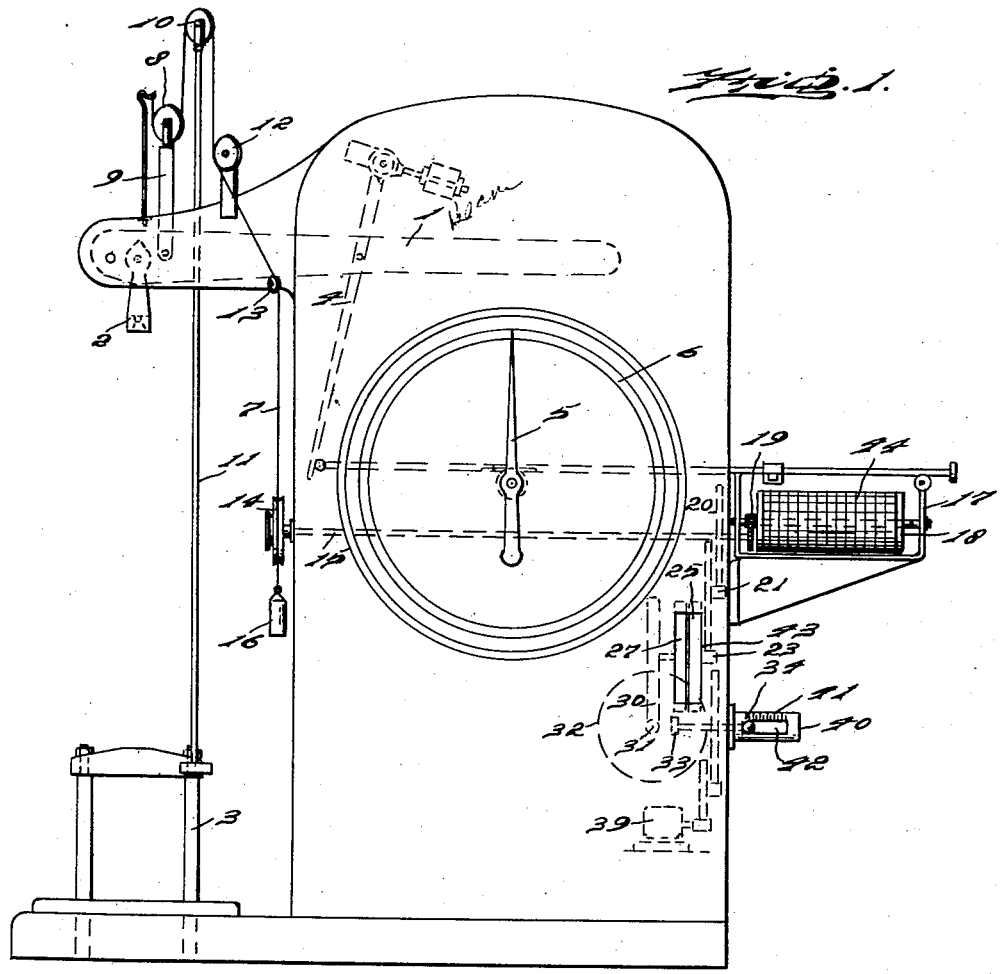
Figure 1 is a front elevation of a testing machine in conjunction with which test load indicating mechanism embodying my invention is employed.
Figure 2:
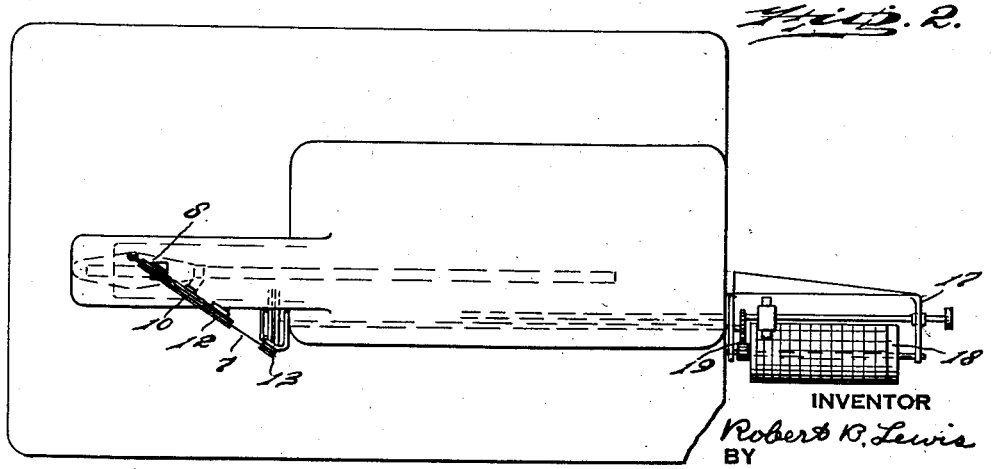
Figure 2 is a top plan view of the testing machine.

Referring to the drawings:

As the construction and cycle of operation of a pendulum dial load indicator weighing system with autographic recorder is clearly set forth in my applications aforesaid and in Bulletin No. 9, supplement to Catalogue 50-A, of the Tinius Olsen Testing Machine Company of Philadelphia, Pa., I have deemed it unnecessary in this case to illustrate and describe in full detail the construction and operation of the testing machine, as this will be clear to those skilled in this art.

The weighing system is of the pendulum type and has a beam 1 responsive to the load applied to a yoke 2 which is connected through the test specimen with a load applying cross head 3. An arm 4 controlled by the action of the weighing system rotates a pointer 5 about the face of a dial 6. A cord 7 fixed at one end to the frame of the testing machine passes around a pulley 8 mounted in a bracket 9 fixed to the beam 1 and around a pulley 10 carried by a support 11 extending upwardly from the crosshead 3. The cord 7 then engages the pulleys 12 and 13 and around a pulley 14 on a shaft 15 and has its free end connected to a weight 16. The shaft 15 is suitably journalled in the machine frame and a bracket 17 in which is mounted a revoluble drum 18 of the autographic mechanism, intergeared at 19 with the shaft 15. The drum 18 is adapted to receive a standard letter size sheet 44 which is cross sectioned to receive the curves of the stress magnification, the load in pounds being indicated lengthwise of the drum and the elongations in inches around the drum. The drum may make several revolutions if necessary.

The shaft 15 has fixed to it a gear 20 which meshes with a compound gear 21 on a shaft 22, suitably journalled. The gear 21 meshes with a pinion 23 on a shaft 24 suitably journalled and carrying a flanged disc 25 having graduations 26 on its periphery. The graduated disc 25 is thus driven in synchronism with the drum 18 at some determined speed relationship.

27 designates a second flanged disc in close proximity to the disc 25 and provided with graduations 28. The disc 27 is fixed to a shaft 29 suitably journalled. A gear 30 fixed to the shaft 29 meshes with a worm shaft 31 suitably journalled and carrying a friction disc 32 driven by a friction roller 33 on a shaft 34 suitably journalled. The shaft 34 has a gear 35 keyed to it. The gear 35 meshes with a compound gear 36 on a shaft 37 suitably journalled. The gear 36 meshes with a gear 38 on the shaft of a synchronous motor 39 which runs at a constant speed. The free end of the shaft 34 extends into a graduated indicating case 40 having graduations 41 and a sight opening 42.

The graduated discs 25 and 27 are visible through a sight opening 43 in the frame or casing of the testing machine. The graduations 41 are indicative of a speed corresponding to the rate of change of length to be applied to the specimen under test, and the shaft 34 is manually adjusted to regulate the speed of the graduated disc 27 so that the desired per unit change in length of the specimen under test will be indicated by the member 27 and the actual change in length of the specimen is indicated by the member 25, both of which will be visible through the sight opening 43.

The rate of change of length of the specimen under test is thus accurately timed.

The rate of change in length in the specimen is in turn regulated by the rate of movement of the cross head 3 which is under the control of the operator.

In some cases, it is desirable to utilize the relative movements of clamps attached to the specimen to actuate the cord 7, as shown in Figure 6. The cord 7 is fixed at one end to the frame of the machine the same as in Figure 1, and passes around a pulley 45 carried by a sleeve 46. The cord then passes around the pulley 10, around a pulley 47 and around a pulley 13. The cord then passes around the pulley 14 and is provided with the weight 16, as will be understood from Figure 1. The sleeve 46 is connected with the specimen by a clamp 48 and the support 11 is connected with the specimen by a clamp 49. The load is applied to the specimen by the cross head 3 as in Figure 1. The speed of rotation of the disc 27 is maintained equal to that of the disc 25 by observing the two and regulating the speed of the disc 27 by adjustment of the member 34. The velocity of the disc 25 is read off of the scale 41.

The disc 27 can be driven at a predetermined constant speed and the disc 25 made to revolve at the same speed by control of the loading means so as to secure a constant rate of strain of the specimen.

The embodiment shown in Figure 6 provides twice the movement of the cord for change in length of the specimen.

It will now be apparent that I have devised a new and useful rate of strain indicator which embodies the features of advantage enumerated as desirable in the statement of the invention and the above description, and while I have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent is:

1. In a rate of strain indicator, a graduated member driven in synchronism with change in length of a specimen under test, a second graduated member in proximity to said first graduated member for visible comparison with it, means to drive said second member at a predetermined rate, and means controlled by the change of length of the specimen to control the drive of said first member.

2. In a rate of strain indicator, a shaft revolved in synchronism with the change in length of a specimen under test, a graduated member driven by it, a second graduated member for visible comparison with said first member, a prime mover driving said second member at a uniform speed, and means, including a speed change adjustment whereby said second member may be rotated in synchronism with said first member.

3. In a rate of strain indicator, a beam, a variable load applicator connected by the specimen with the beam, a graduated member, means controlled by the elongation of the specimen to drive said member, and a second graduated member driven at a timed rate, said members being positioned in proximity to each other.

4. In a rate of strain indicator, means to vary the change in length of a specimen under test as desiired, and means comprising juxtaposed movable graduated members for visible comparison to determine and indicate what this rate of change per unit in length of the specimen is.

5. In a rate of strain indicator, a shaft revolved in synchronism with the change in length of a specimen under test, a graduated member driven by said shaft, a second graduated member, adjustable means to drive said second member, and loading means to drive said first member whereby said members may be driven in synchronism.

6. In a rate of strain indicator, two graduated members arranged in proximity to each other for visible comparison, means to drive one of said members at a predetermined constant rate, and loading means to revolve the other member at the same speed and controllable to secure a constant rate of strain of the specimen.

7. The combination with the revoluble drum of the autographic mechanism of a weighing system of a testing machine, of a graduated member, means to drive said member in synchronism with the drum at a predetermined speed relationship, a second graduated member in proximity to said first graduated member for visible comparison, means to drive said second member at a predetermined constant speed, and means to control the loading means of the testing machine to secure a constant rate of strain of the specimen.

8. In a rate of strain indicator, a graduated disc revolubly mounted, a revoluble drum of the autographic mechanism of a weighing system, means to revolve said disc in synchronism with the drum at a predetermined speed relationship, a second graduated disc revolubly mounted in proximity to said first disc for visible comparison, a motor, and driving connections between said motor and said second disc and including a speed change adjustment to cause said second disc to be driven at a selected constant speed.

ROBERT B. LEWIS.